United States Patent
Scalf et al.

(10) Patent No.: US 12,240,270 B2
(45) Date of Patent: Mar. 4, 2025

(54) WHEEL SUPPORT ASSEMBLY FOR BOTTOM DRAWER

(71) Applicant: Midea Group Co., Ltd., Foshan (CN)

(72) Inventors: Eric Scalf, Louisville, KY (US); Vinayak Naik, Louisville, KY (US)

(73) Assignee: Midea Group Co., Ltd., Guangdong (CN)

( * ) Notice: Subject to any disclaimer, the term of this patent is extended or adjusted under 35 U.S.C. 154(b) by 217 days.

(21) Appl. No.: 15/930,953

(22) Filed: May 13, 2020

(65) Prior Publication Data

US 2021/0354510 A1    Nov. 18, 2021

(51) Int. Cl.
*B60B 33/06* (2006.01)
*A47B 88/41* (2017.01)
*B60B 33/04* (2006.01)
*F25D 25/02* (2006.01)

(52) U.S. Cl.
CPC ............ *B60B 33/066* (2013.01); *A47B 88/41* (2017.01); *B60B 33/045* (2013.01); *F25D 25/025* (2013.01)

(58) Field of Classification Search
CPC ... F25D 2400/38; B60B 33/045; B60B 33/06; B60B 33/066; A45C 5/14; A45C 5/146; A47B 88/41; A47B 88/413
See application file for complete search history.

(56) References Cited

U.S. PATENT DOCUMENTS

| | | | |
|---|---|---|---|
| 344,521 A | 6/1886 | Culver | |
| 1,058,837 A * | 4/1913 | Zikmund | B60B 33/06 16/34 |
| 2,051,627 A * | 8/1936 | Weinmann | B60B 33/045 244/109 |
| 2,803,510 A * | 8/1957 | Carbary | F24C 15/08 16/34 |
| 2,891,764 A * | 6/1959 | Pearne | B64F 5/50 267/248 |
| 2,996,752 A * | 8/1961 | Pope | B60B 33/0002 293/58 |
| 3,354,878 A | 11/1967 | Edmond | |
| 3,393,950 A | 7/1968 | Dutcher et al. | |
| 3,529,881 A | 9/1970 | Kaldenberg | |
| 3,656,203 A | 4/1972 | Waflart, Jr. | |
| 3,912,350 A | 10/1975 | Gurubatham | |
| 4,092,973 A | 6/1978 | Bernazzani | |

(Continued)

FOREIGN PATENT DOCUMENTS

| | | |
|---|---|---|
| CN | 2332974 Y * | 3/1998 |
| CN | 206365578 U | 8/2017 |

(Continued)

OTHER PUBLICATIONS

International Search Report and Written Opinion issued in PCT Application No. PCT/CN2021/093561, dated Aug. 9, 2021.

(Continued)

Primary Examiner — Emily M Morgan

(74) Attorney, Agent, or Firm — Gray Ice Higdon

(57) ABSTRACT

A wheel support assembly for a bottom drawer is disclosed. When the bottom drawer is open, the wheel support assembly may provide support in a deployed position. When the bottom drawer is closed, the wheel support assembly may be retracted in a cavity to be invisible to consumers.

12 Claims, 7 Drawing Sheets

(56) References Cited

U.S. PATENT DOCUMENTS

| | | | | |
|---|---|---|---|---|
| 4,097,955 | A | * | 7/1978 | Foge ..................... A45C 5/146 |
| | | | | 280/37 |
| 4,397,062 | A | * | 8/1983 | Huang .................... B60B 33/06 |
| | | | | 16/33 |
| 4,783,879 | A | * | 11/1988 | Weaver ................... B60B 33/04 |
| | | | | 280/43.24 |
| 4,784,446 | A | | 11/1988 | Newhouse |
| 4,848,312 | A | | 7/1989 | Roy |
| 5,232,232 | A | * | 8/1993 | Kishi ..................... B60B 33/06 |
| | | | | 280/43.1 |
| 5,253,389 | A | * | 10/1993 | Colin ..................... B60B 33/06 |
| | | | | 16/34 |
| 5,365,635 | A | | 11/1994 | Jang |
| 5,873,145 | A | * | 2/1999 | Chou .................... B60B 33/045 |
| | | | | 301/125 |
| 5,937,481 | A | | 8/1999 | Faringosi |
| 6,253,568 | B1 | | 7/2001 | Peffley |
| 6,263,867 | B1 | | 7/2001 | Skelton |
| 6,315,368 | B1 | * | 11/2001 | Kuo ..................... B60B 33/0002 |
| | | | | 301/111.01 |
| 6,594,856 | B1 | * | 7/2003 | Cherukuri ........... B60B 33/0005 |
| | | | | 16/33 |
| 7,832,745 | B2 | | 11/2010 | Rauch, Jr. |
| 8,607,414 | B1 | | 12/2013 | Kinsela |
| 9,157,641 | B1 | | 10/2015 | Draper |
| 9,523,530 | B2 | | 12/2016 | Dubina et al. |
| 10,443,286 | B1 | | 10/2019 | Cocco |
| 2002/0109446 | A1 | | 8/2002 | Arnold |
| 2002/0166202 | A1 | * | 11/2002 | Maupin ............... B60B 33/0005 |
| | | | | 16/19 |
| 2003/0025424 | A1 | * | 2/2003 | Graves .................. F25D 25/024 |
| | | | | 312/198 |
| 2004/0226135 | A1 | * | 11/2004 | Wang .................. B60B 33/0063 |
| | | | | 16/44 |
| 2006/0288526 | A1 | | 12/2006 | Larson |
| 2008/0223356 | A1 | | 9/2008 | Shenouda |
| 2009/0151608 | A1 | | 6/2009 | Aldred et al. |
| 2014/0262660 | A1 | * | 9/2014 | D'Angelo ............ A45C 13/262 |
| | | | | 190/18 A |
| 2015/0219387 | A1 | | 8/2015 | Kim et al. |
| 2018/0099180 | A1 | * | 4/2018 | Wilkinson ........... A63B 71/023 |
| 2020/0025441 | A1 | * | 1/2020 | Ji ......................... F25D 25/025 |

FOREIGN PATENT DOCUMENTS

| | | | | |
|---|---|---|---|---|
| CN | 109708371 | A | | 5/2019 |
| CN | 109751828 | A | | 5/2019 |
| CN | 109780770 | A | | 5/2019 |
| CN | 110726277 | A | | 1/2020 |
| CN | 114641660 | A | | 6/2022 |
| DE | 8416860 | U | | 11/1984 |
| EP | 0632180 | B1 | | 9/1996 |
| GB | 434161 | A | * | 11/1934 |
| GB | 478527 | A | * | 9/1936 |
| GB | 582371 | A | * | 9/1944 |
| JP | 3084477 | U | | 3/2002 |
| KR | 970007232 | A | | 2/1997 |
| KR | 19980031127 | A | | 7/1998 |
| KR | 19990037791 | U | | 10/1999 |
| KR | 200170546 | Y1 | * | 3/2000 |
| KR | 2000007452 | A | | 12/2000 |
| KR | 20000074252 | A | | 12/2000 |
| KR | 20030040793 | A | | 5/2003 |
| KR | 20030040794 | A | | 5/2003 |
| KR | 20080020274 | A | | 3/2008 |
| KR | 20090011707 | A | | 2/2009 |
| KR | 20090126546 | A | | 12/2009 |
| KR | 101118357 | 8 | | 3/2012 |
| WO | WO2009027405 | A1 | | 3/2009 |

OTHER PUBLICATIONS

Draper, Richard James, Oven Door Support Legs, https://forsalebyinventor.com, 2014.

The State Intellectual Property Office of People's Republic of China, The First Office Action issued in Application No. 202180006238.3, 15 pages, dated Nov. 1, 2022.

Zhu, Jingui, Hand-made Spring, Machinery Industry Press, 10 pages, dated Dec. 1968.

The State Intellectual Property Office of People's Republic of China, Second Office Action issued in Application No. 202180006238.3, 12 pages, dated May 5, 2023.

The State Intellectual Property Office of People's Republic of China, Decision on Rejection issued in Application No. 202180006238.3, 13 pages, dated Aug. 10, 2023.

* cited by examiner

WHEEL SUPPORT ASSEMBLY FOR BOTTOM DRAWER

BACKGROUND

Bottom drawers in kitchen appliances are becoming more common. For example, some residential or commercial refrigerators have freezer drawers that operate by sliding on rails that extend outward of the freezer compartment. While some consumers appreciate the sliding drawer freezer, there are limits to how far the drawer may slide out. Given that often very heavy loads (heavy foodstuffs, for example) are placed in freezers, the freezer drawer is typically prevented from sliding out more than a small amount, so that the sliding rails do not become damaged or bent under the heavy load. Also, freezer drawer slide distance is typically limited so as to prevent a tipping hazard for the entire refrigerator that would result if too much weight in the freezer were allowed to extend too far out. Consequently, existing freezer drawer devices necessarily have a limited distance they are allowed to open, which prevents users from placing some desired items into the freezer, and is therefore not desirable.

Accordingly, a need exists for a bottom drawer support that enables the drawer to be opened more fully, as well as enables the drawer to accept more weight and larger items without increasing the risk of tipping. For freezer drawers in particular, a need exists for such a support that is contained within the drawer door such that the drawer door can still seal against the appliance to retain insulating qualities. Further, a need exists for such a support that can be moved into a retracted state in which it is not visibly unappealing, since such appliances are seen and used by consumers every day.

SUMMARY

The present disclosure relates to a support assembly for a bottom drawer, and more particularly to a retractable wheel support assembly allowing a bottom drawer to be fully extended while helping prevent the potential tip and deflection. The support assembly also reduces the load on sliding rails and prevents sliding rails from bending.

In some embodiments, a wheel support assembly coupled to a door of a drawer to support a weight of the door, the drawer, and substances inside the drawer is disclosed. The wheel support assembly may comprise a housing having sidewalls and a cavity defined within the housing. The cavity may be capable of receiving a caster assembly including a first shaft. The housing may further comprise a rotation member, a second shaft, and a retraction mechanism. The rotation member may rotate around the second shaft, and the retraction mechanism may further comprise a third shaft.

In some embodiments, a wheel support assembly coupled to a door of a drawer to support a weight of the door, the drawer, and substances inside the drawer is disclosed. The wheel support assembly may comprise a housing and a cavity defined within the housing. The cavity may be capable of receiving a caster assembly including a first shaft. The housing may further comprise a rotation member, a second shaft, and a retraction mechanism. The rotation member may rotate about the second shaft, and the retraction mechanism may further comprise a third shaft. The caster assembly may be retractable in the cavity when the drawer is fully closed, and the caster assembly may move into a deployed position partially below the cavity when the drawer translates a first distance.

In some embodiments, a wheel support assembly coupled to a drawer door is disclosed. The wheel support assembly may comprise a housing disposed within a space in the drawer door. The housing may have a cavity therewithin. A spring may have a first end in contact with the housing and a second end. A rotation member may further comprise a shaft. The rotation member may be in contact with the second end of the spring, and the spring may bias the rotation member to move in a first direction. A caster assembly may be coupled to the rotation member, and the caster assembly may further comprise a caster wheel and a caster wheel arm. The caster wheel arm may be coupled to the rotation member, and the caster wheel arm may rotate about the shaft of the rotation member with the spring bias in the first direction and against the spring bias in an opposite second direction.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. All of the above outlined features are to be understood as exemplary only and many more features and objectives of the various embodiments may be gleaned from the disclosure herein. Therefore, no limiting interpretation of this summary is to be understood without further reading of the entire specification, claims and drawings, included herewith. A more extensive presentation of features, details, utilities, and advantages of the present disclosure is provided in the following written description of various embodiments of the disclosure, illustrated in the accompanying drawings, and defined in the appended claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the disclosure.

DETAILED DESCRIPTION

Figure 1:
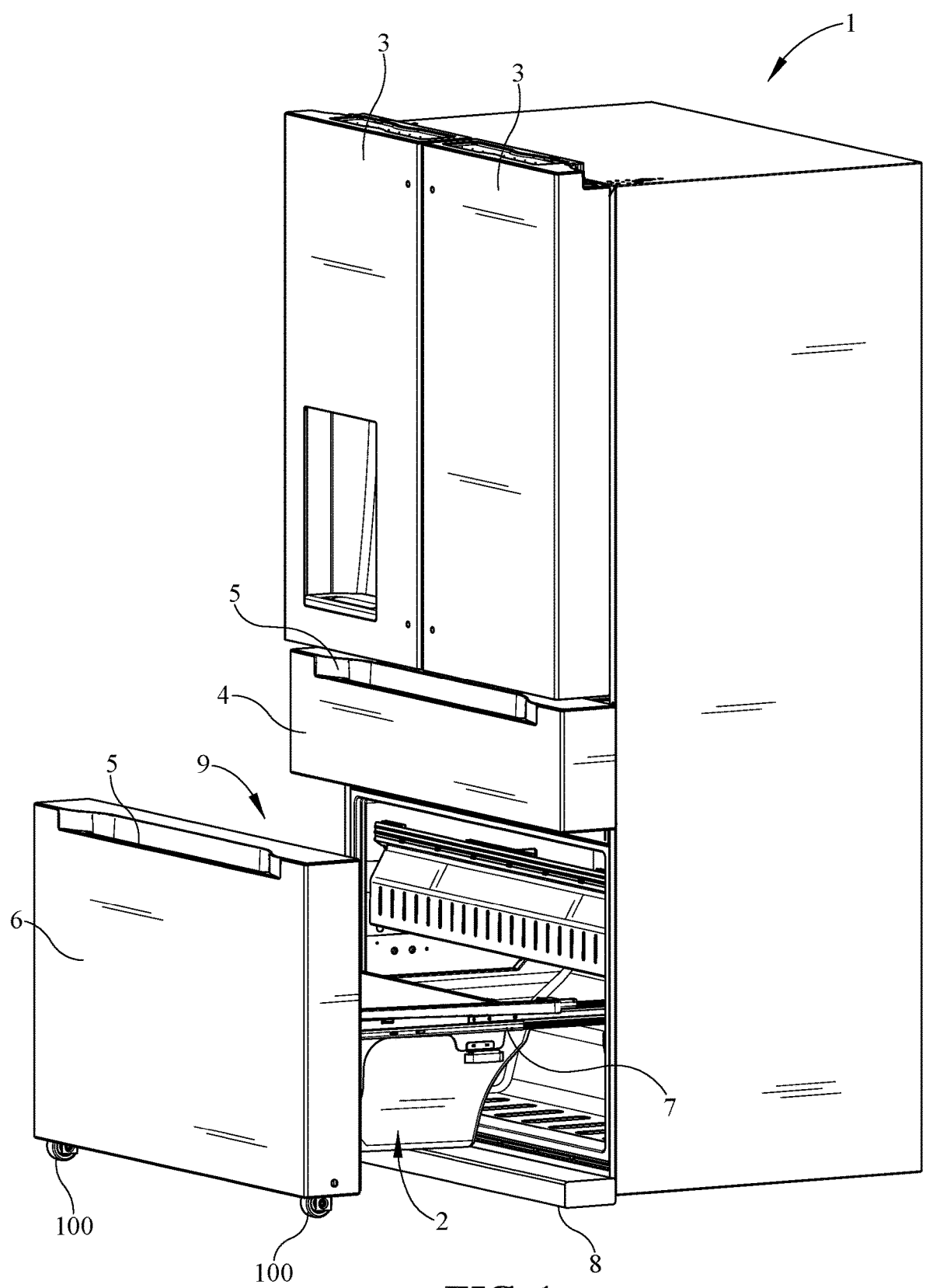
FIG. 1 is a perspective view of a residential refrigerator having two wheel support assemblies for a bottom drawer in accordance with various embodiments, with the bottom drawer fully extended.

It is to be understood that a wheel support assembly for a bottom drawer is not limited in its application to the details of construction and the arrangement of components set forth in the following description or illustrated in the drawings.

The described embodiments are capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to direct physical or mechanical connections or couplings. It should be noted that he rotation mechanism could vary greatly and still accomplish the same intent.

The embodiments discussed hereinafter will, for convenience only, focus on the implementation of the hereinafter-described apparatus and techniques within a residential refrigerator with a freezer drawer at the bottom. As shown in the Figures, the particular embodiment depicted shows a refrigerator appliance having two freezer compartments below a set of French doors, wherein the bottom drawer is a freezer drawer to which the support solution described herein has been employed. However, it will be appreciated that the apparatus and techniques may also be used in connection with other types of appliances, and even in other types of equipment. For example, the refrigerator/freezer might have only one drawer, or might not include French doors. The appliance might even be just a freezer, with no refrigerator above. Also, the herein-described designs may be used for a kitchen cabinet or other apparatus with a bottom drawer.

Figure 2:
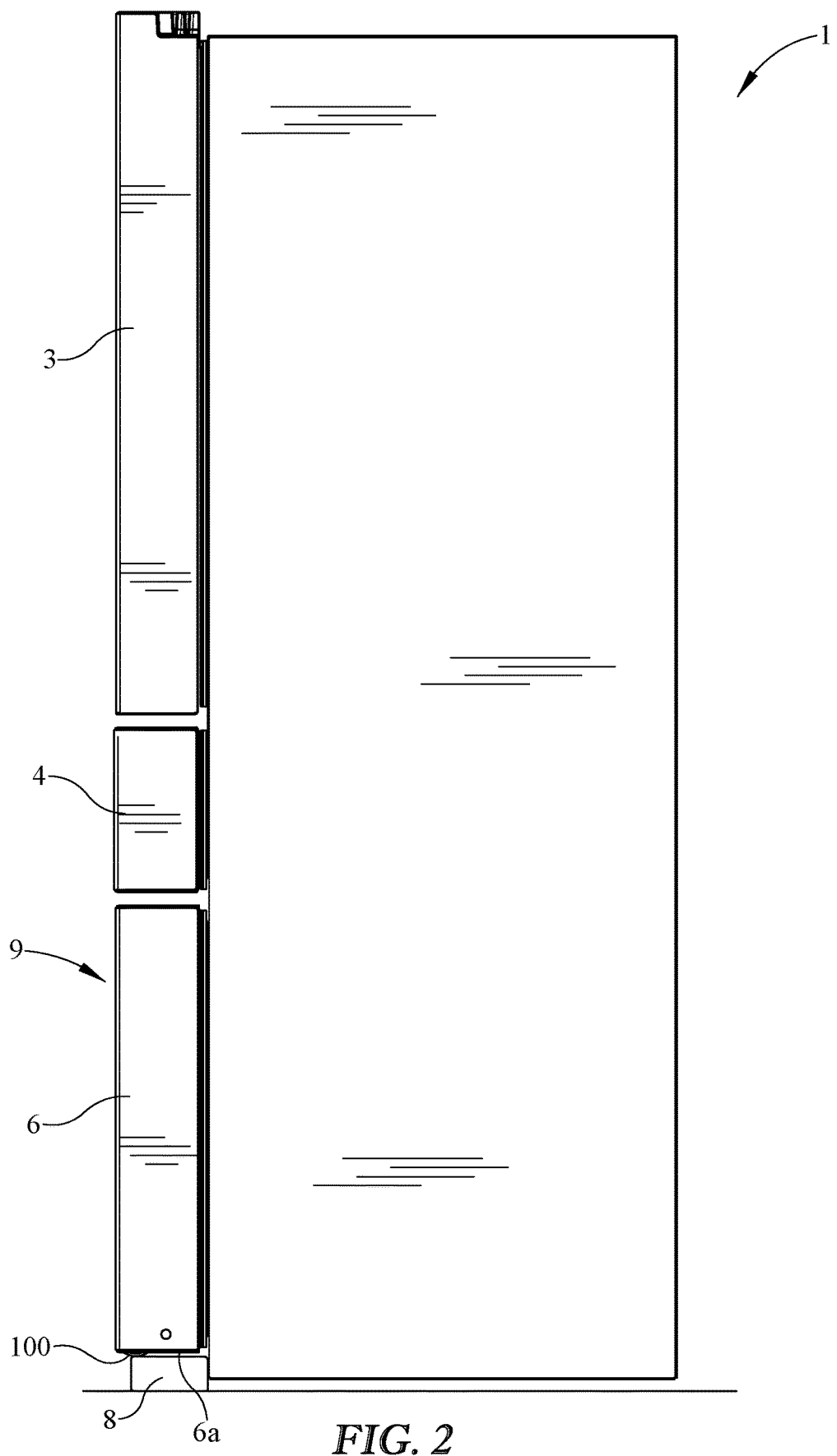
FIG. 2 is a side elevation view of the residential refrigerator of FIG. 1 with the bottom drawer closed.

Turning now to the drawings, wherein like numbers denote like parts throughout the several views, a wheel support assembly for a refrigerator bottom drawer in accordance with various embodiments will be described with reference to the accompanying drawings. FIGS. 1 and 2 illustrate a double drawer French door refrigerator 1 having an upper storage region including a refrigerating chamber, a freezer drawer chamber, and a lower compartment having a main freezer compartment 9, including a storage bin 2. A pair of doors 3 may be installed at an upper portion of the upper storage region of the refrigerator 1 to separately open the refrigerating chamber. The pair of doors 3 may be pivotally connected to the sides of the main body of the refrigerator 1. In the dual freezer compartment embodiment shown, a top freezer drawer door 4 may be installed below the doors 3 at a lower portion of the upper storage region (i.e., a middle portion of the main body of the refrigerator 1) to slide in a forward/backward direction to open and close the freezer drawer chamber. A handle 5 may be formed at the top of the front surface portion of the top freezer drawer door 4, or attached thereto, to work as a means to open and close the freezer drawer chamber.

Similarly, a bottom freezer drawer door 6 with a handle 5 may be disposed at the lower compartment to open and close the main freezer compartment 9. The interior of the main freezer compartment 9 includes a storage bin 2 that defines a storage space. A pair of slides or rails 7 may be provided that are mounted on inside walls of the main freezer compartment 9 and couple with the bottom freezer drawer door 6 to enable the bottom freezer drawer door to slide between a first position (a fully closed position) and a second position (a fully open position). A toe kick 8 may also be provided near the base of the front face of the main body of the refrigerator 1. The toe kick 8 may be a fixed structural member designed intentionally to provide adequate toe space for consumers. In some embodiments, as shown in FIGS. 1, 2, and 5A-C, the toe kick 8 may be in a substantially rectangular polyhedron configuration. Many other configurations are possible, however, including, without limitation, various forms and arrangements of solid bodies having one or more curved surfaces, ramps, or even irregular shapes.

The bottom freezer drawer door 6, which includes a bottom surface 6a, may remain similar in construction to that of typical freezer drawers in the industry, and may, for example, have a metal outer portion, a plastic inner portion, and be injected with insulating material such as, for example, expanding foam. In typical use, the bottom freezer drawer door 6 according to one embodiment herein is desirably moved linearly from its first position to its second position, and vice versa. In its travel from the first position to the second position, typically the bottom surface 6a remains spaced above the floor in its horizontal travel. This space provides opportunity for including one or more wheel support assemblies 100. As shown in FIG. 1, the inclusion of one or more wheel support assemblies 100 provides support for the weight of the main freezer compartment 9 as the wheels can contact the ground when the bottom freezer drawer door moves away from the first position. This provides additional vertical support for loads in the main freezer compartment 9 and/or main freezer storage bin 2, which in turn provides support against tipping of the refrigerator 1. With this additional support, the bottom freezer drawer door 6 may be extended farther (that is, the second position can be farther away from the first position), thus enabling improved and enlarged access to the main freezer storage bin 2 inside. When the bottom freezer drawer door 6 is closed (in its first position), as shown in FIG. 2, the wheel support assembly 100 may move into a retracted position to avoid adversely impacting the aesthetic qualities of the refrigerator 1. The detailed structure of the wheel support assembly 100, and the operation schematic for both the extension and retraction will be discussed in further detail below.

Figure 3:
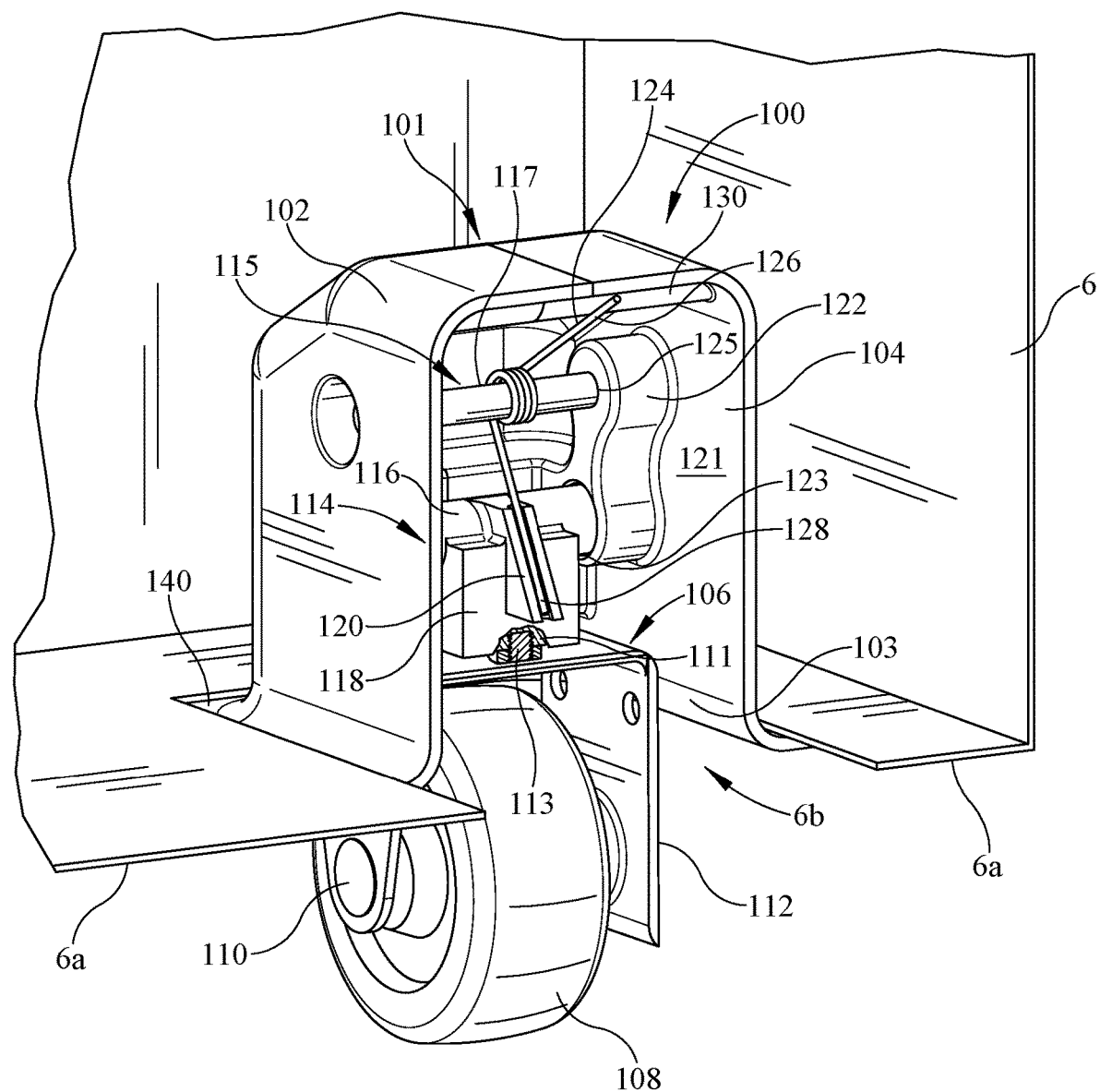
FIG. 3 is an enlarged view of the wheel support assembly of FIG. 1 in a deployed position.
Figure 4:
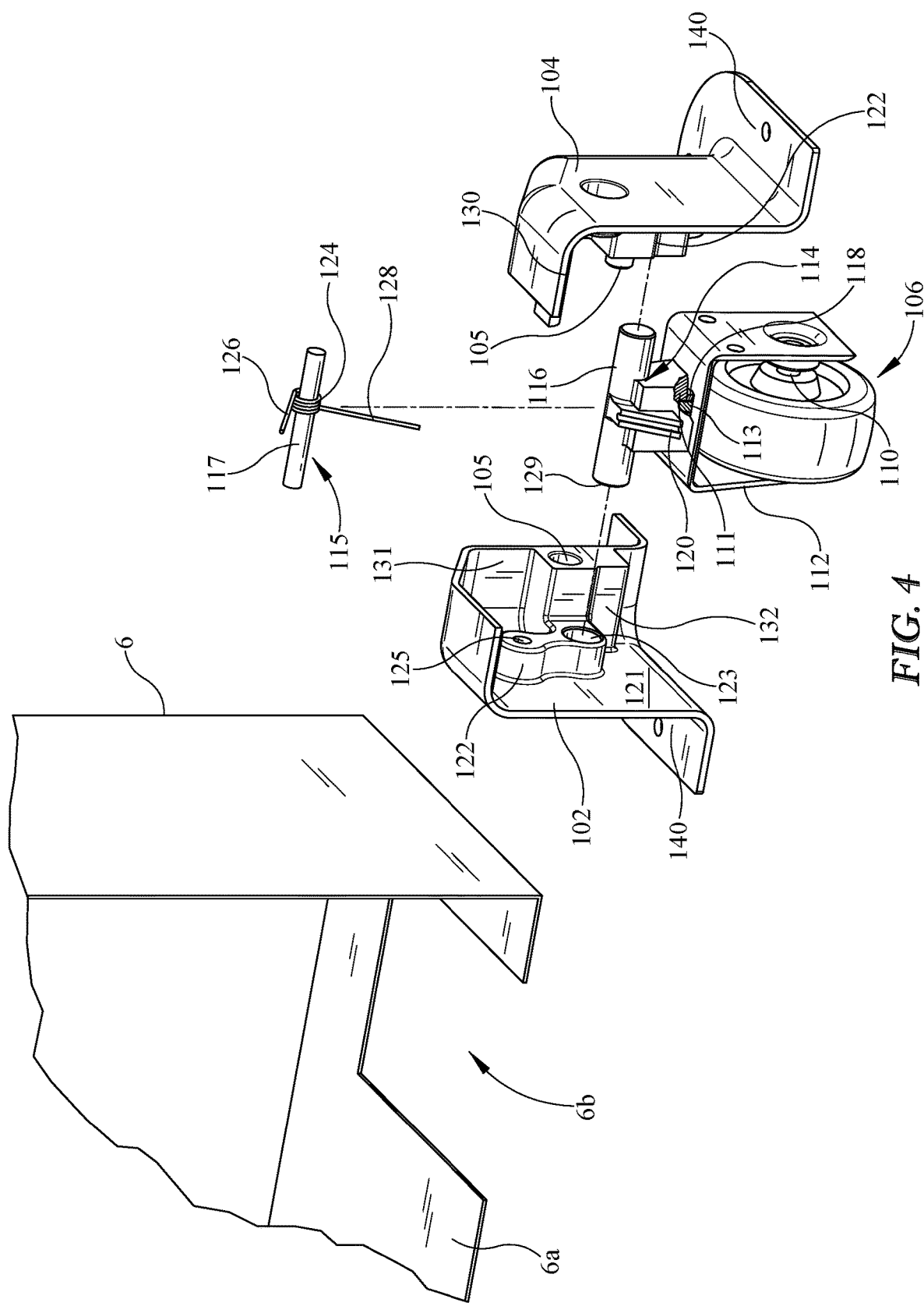
FIG. 4 is an exploded view of the wheel support assembly of FIG. 1.

FIG. 3 illustrates the wheel support assembly 100 in a deployed position to support the bottom freezer drawer door 6 in accordance with various embodiments. The wheel support assembly 100 may include a housing 101 that may be an integrally formed piece comprising multiple components and may be adapted to be secured to the bottom surface 6a in a recess 6b. In some embodiments, the wheel support assembly 100 may be itself fully assembled and then coupled to the bottom surface 6a in the recess 6b. The housing 101 of the wheel support assembly 100 may, for example, be a single piece formed to define a cavity 103 therein and having one or more flanges 140, or it may alternatively include a first member 102 and a second member 104 for defining the cavity 103 therebetween for housing the multiple components of the wheel support assembly 100 in both the retracted and deployed positions in the inner space of the bottom freezer drawer door 6. The area inside the bottom freezer drawer door 6 around the housing 101 may be hollowed out to make room for adequate installation of the housing 101, while still allowing adequate insulation to surround the housing 101 to facilitate proper functioning and insulation properties of the main freezer compartment 9. In embodiments where housing 101 comprises separate members, the first member 102 may be coupled to the second member 104 through a pin-and-slot connector 105 as shown in FIG. 4. It should be noted that other mechanisms for coupling separate member together (e.g., dovetails, tongue-and-grooves, welding, adhesives, fasteners, etc.) may also be acceptable.

Various methods of coupling the housing 101 to the bottom freezer drawer door 6 via the flange 140 and/or the first and second members 102, 104, are possible, including, for example, welding, adhesives, geometric coupling (e.g., dovetails, tongue-and-grooves, pin-and-slots, etc.), and fasteners of many types including, for example, screws, bolts, rivets, pins, ball detents, spring retainers, etc. In some embodiments, wheel support assemblies 100 may be secured near two side corners of the bottom surface 6a of the bottom freezer drawer door 6. In some embodiments, there may be only one wheel support assembly 100, generally disposed in the middle of the bottom surface 6a of the bottom freezer drawer door 6. In some embodiments, there may be a plurality of wheel assemblies 100 installed at various locations across the bottom surface 6a of the bottom freezer drawer door 6. It should be noted that any suitable locations and quantities for the wheel support assembly 100 that may be enough to support the bottom freezer drawer door 6 and the main freezer compartment 9 may be acceptable.

Inside of the cavity 103 defined in the housing 101 (e.g., by the first and second members 102 and 104, respectively), the wheel support assembly 100 may include a caster assembly 106 comprising a caster wheel 108, a first shaft 110, and a caster wheel arm 112. The first shaft 110 may extend through aligned holes on the side portions of the caster wheel arm 112, and the caster wheel 108 may be configured to rotate about the first shaft 110. It should be noted that the caster wheel 108 may be in different styles and made of different materials (e.g., rubber, polyurethane, polyolefin, nylon, phenolic, metal, etc.) suitable or desirable for its intended use.

The caster assembly 106 may be secured to a rotation member 114 comprising a second shaft 116, an arm 118, and a spring receiving portion 120. The arm 118 is coupled to the second shaft 116 and extends radially outwardly therefrom. The spring receiving portion 120 provides a location for an arm of a torsion spring (described below) to engage and bear against so as to impart a spring rotational force to the second shaft 116. The caster wheel arm 112 is coupled to the arm 118. In this manner, the caster assembly 106 itself rotates about second shaft 116, allowing the caster 106 to rotate from the retracted position to the deployed position, and vice versa. The wheel support assembly 100 further includes a third shaft 117 spaced generally above second shaft 116 within the housing 101. The housing 101, or alternatively the first and second members 102 and 104, may respectively have a spaced shaft lug 122 projected on side walls 121 (best shown in FIGS. 3 and 4) of the housing 101 (defined by the first and second members 102 and 104). The shaft lug 122 may include a first receptacle 123 for receiving the second shaft 116 and a second receptacle 125 for receiving the third shaft 117 as shown in FIGS. 3 and 4.

In some embodiments, a retraction mechanism 115 comprising a torsion spring 124 with a first end 126 and a second end 128 may be disposed around the third shaft 117 as best illustrated in FIG. 3. The first end 126 may bear against a surface inside the housing 101 (best shown in FIGS. 5A-C), or against a designated spring projection 130, and the second end 126 may rest in the spring receiving portion 120 on the rotation member 114. With such an arrangement, the rotation member 114 and the retraction mechanism 115 may cooperate with each other to bias the caster assembly 106 in the deployed position until retracted by a force being applied to the caster assembly 106, such as by the caster wheel 108 pushing against the toe kick 8. It should be noted that other similar retraction mechanisms may be applied to the rotation of the caster assembly 106 to keep the rotation tight and controlled.

Figure 5A:
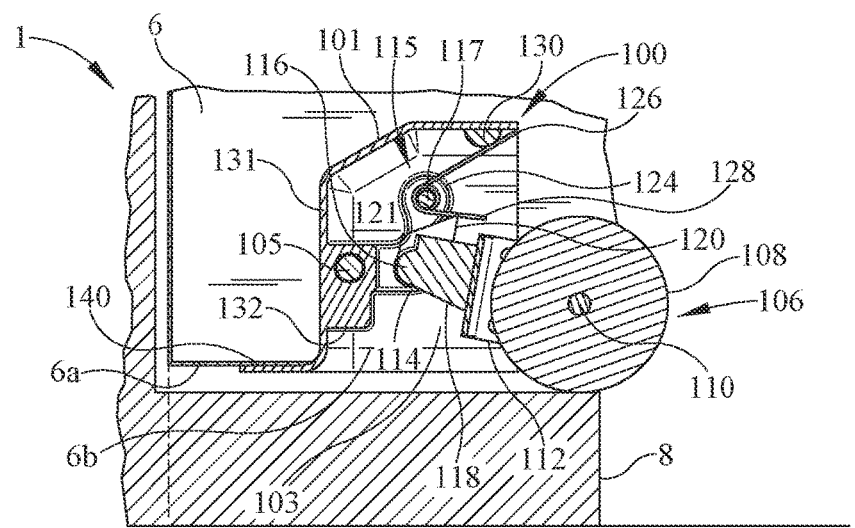
FIGS. 5A-C are operation schematic views of the wheel support assembly of FIG. 1 shifting from a retracted position to a deployed position.
Figure 5B:
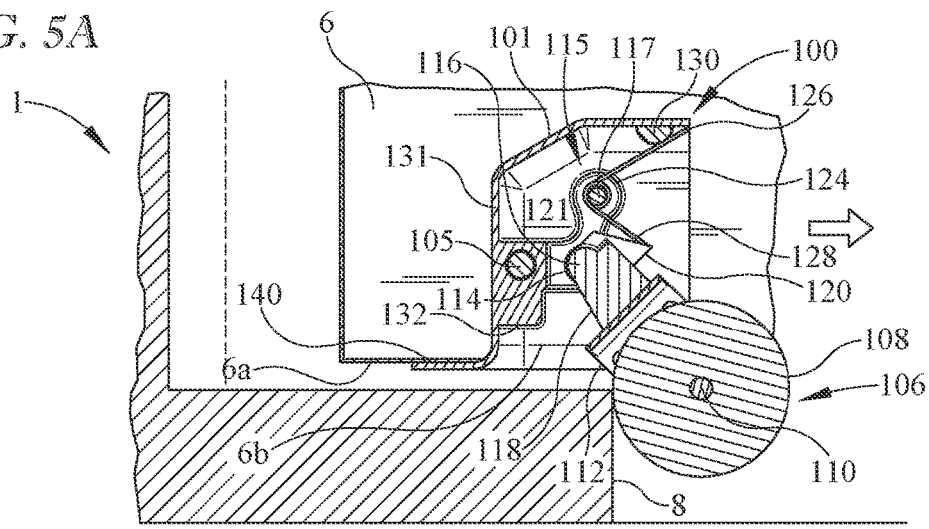
Figure 5C:
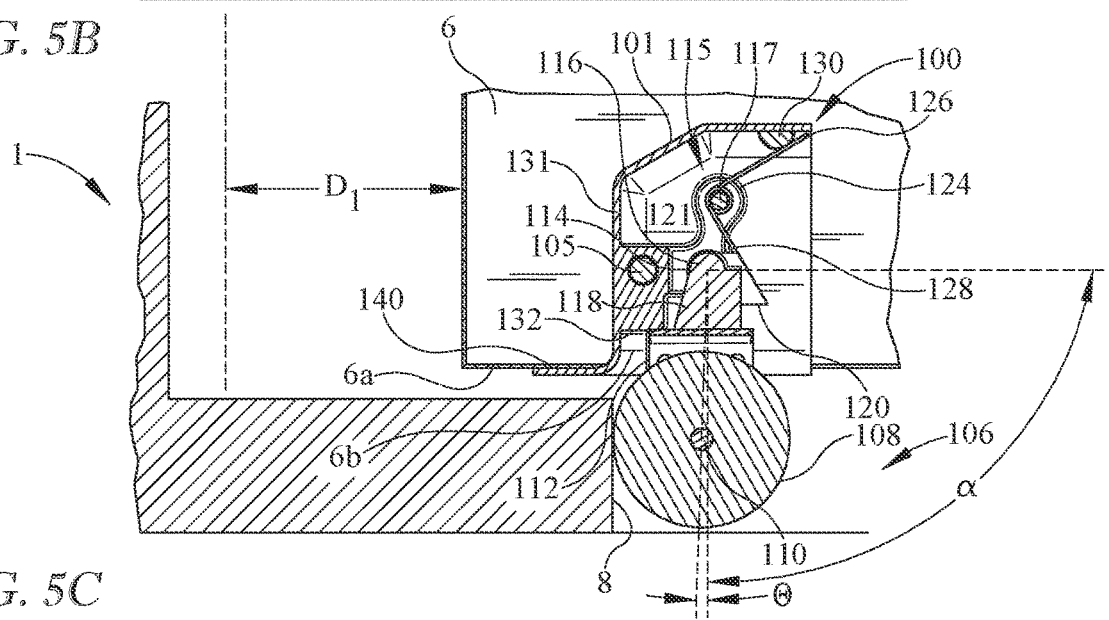
Figure 5D:
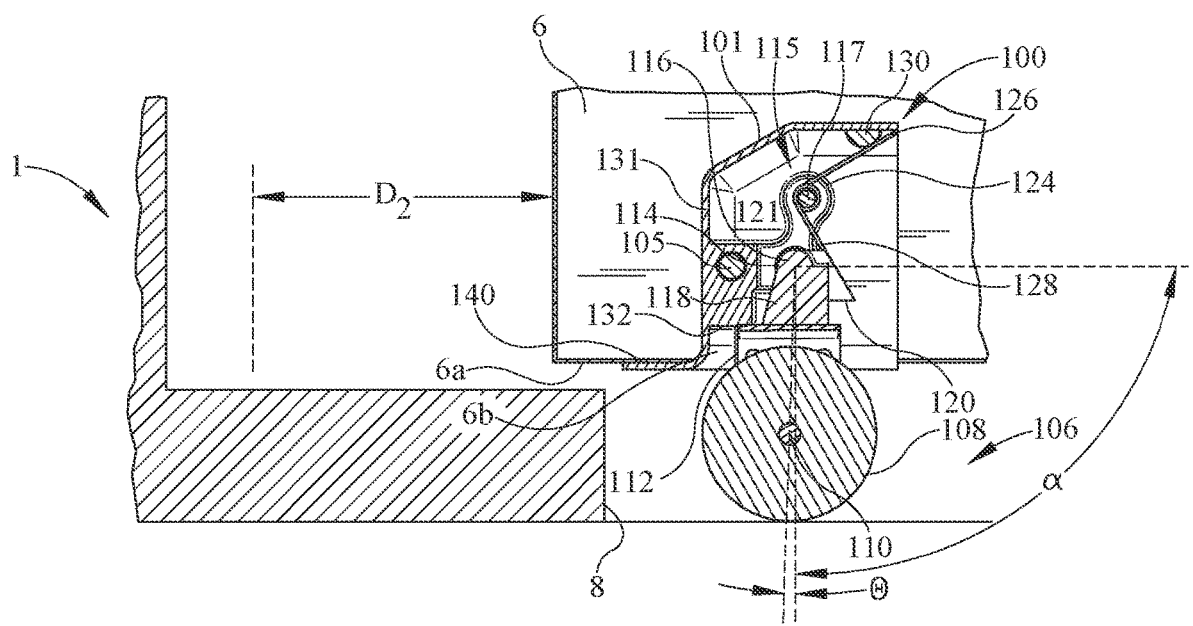
FIG. 5D is an operation schematic view of the wheel support assembly of FIG. 1 in a fully deployed position with the wheel touching the ground.

In operation the bias force of the torsion spring 124 tends to maintain the caster assembly 106 in a deployed condition (that is, in FIGS. 5A-C the torsion spring serves to bias the caster assembly 106 in a clockwise rotation). To prevent the caster assembly 106 from over-rotating and provide additional support to the main freezer compartment 9, in some embodiments one portion of the rotation member 114 may be retained by a stop projection 132 (best shown in FIGS. 5A-C). The stop projection 132 may, as but one example, be located on a back surface 131 (best shown in FIGS. 5A-C) of the housing 101. In the Figures, the angle alpha α represents the angle of deployment from a horizontal line passing through the center of the second shaft 116. Therefore, a 90° value of α indicates that the first shaft 110 is directly below the second shaft 116 (that is, a line passing between the center of first shaft 110 and the center of second shaft 116 is vertical). The angle theta θ represents what degree of rotation beyond vertical (that is, how much beyond "over center") the caster assembly 106 is. The caster assembly 106 may be capable of a range of rotational positions. Theoretically, α could be anything from approximately 90° to approximately 180°. However, it is preferable to have the rotational angle α slightly more than 90° so as to place the caster assembly 106 slightly "over center" from the retracted position to the deployed position, but not so far as to constitute too much travel requiring more space within housing 101, as best shown in FIGS. 5A-C. Although any angle between 90° and 180° could be possible, it is preferable that α be approximately 90° to approximately 100° (in which case θ would be approximately 0 to approximately 10), and most preferably α would be approximately 90.5° to about 92° (in which case θ would be approximately 0.5 to 2), as shown in FIGS. 5C-D. In other words, the first shaft 110 (the axle of the caster wheel 108) may be capable to pass beyond the second shaft 116 (the rotation axis of the caster assembly 106) in the deployed position. This may allow the caster wheel 108 not to buckle by touching the ground when a heavy load needs to be supported.

In reality, the nook floor may be at a different height compared with the rest of floor in a room, and the floor made of different materials (e.g., laminate, hardwood, tile, etc.) in different locations may also be in different heights. To accommodate those possible height variations, the height of the caster assembly 106 may be preferably capable of adjustment. In some embodiments, there may be at least one threaded rod 113 between the caster wheel arm 112 and the arm 118 for adjusting the height of the caster assembly 106 as shown in FIGS. 3 and 4. The height may be adjusted by moving the threaded rod 113 up and down to a desired position and locking the height with a locknut 111 and a washer. It should be noted that other feasible height adjusting mechanisms may also be used here.

The manner in which the wheel support assembly 100 may move from the retracted position to the deployed position is depicted in FIGS. 5A-C. Additionally, the wheel support assembly 100 may involve the caster wheel 108 not in contact with the ground (FIG. 5C) or in contact with the ground (FIG. 5D). FIG. 5A illustrates an embodiment when the bottom freezer drawer door 6 is fully closed, and the caster assembly 106 is fully stowed in the cavity 103 of the housing 101, which is in the hollow portion of the bottom freezer drawer door 6 and is not visible to consumers. When the bottom freezer drawer door 6 is fully closed, the caster wheel 108 may rest against the top surface of the toe kick 8, under a bias force of torsion spring 124. The spring receiving portion 120 may receive the second end 128 of the torsion spring 124 as shown in FIG. 5A. The first end 126 of the torsion spring 124 is counteracted by the spring projection 130. The torsion spring 124 may be thereby "compressed", e.g., the first end 126 is forced against the normal spring torsion to be closer to the second end 128. When the bottom freezer drawer door 6 is gradually opened by a user (as shown in the direction in FIG. 5B), the caster wheel 108 may start to "unwind" and therefore rotate in a first direction (clockwise as shown in FIG. 5B) as the caster assembly 106 exits the top surface of the toe kick 8. Thus, the caster assembly 106, under the bias force of the torsion spring 124, may be automatically rotated in the first direction (clockwise) around the second shaft 116. When the bottom freezer drawer door 6 opens beyond a first distance D1, where caster assembly 106 is clear of the toe kick 8, as shown in FIG. 5C, the caster assembly 106 may be fully off the top surface of the toe kick 8, and the torsion spring 124 may be unwound to permit the caster assembly 106 to permit a portion of the rotation member 114 to be retained by the stop projection 132 and enable the caster wheel 108 to extend out and potentially contact the ground to support the bottom freezer drawer door 6 and the main freezer compartment 9. In some embodiments, it is desired to have the caster wheel 108 always be in contact with the ground beyond distance D1, but in preferred embodiments, caster wheel 108 contacts the ground only if a pre-determined amount of weight of the bottom freezer exists. Therefore, there may be a slight amount of ground clearance built into the caster assembly 106 to keep the caster wheel 108 off the ground a small distance (e.g., approximately 1 to approximately 10 millimeters) when the drawer is empty, as will be discussed in more detail below. In reverse, when the bottom freezer drawer door 6 is closed, the caster wheel 108 may be retracted by a first force applied to the caster assembly 106 against the bias force of torsion spring 124. The first force may be from a portion of the caster assembly 106 contacting an object. For example, the caster wheel 108 makes contact with the toe kick 8, thus retracting the caster assembly 106 in a second direction opposite to the first direction (that is, rotating counter-clockwise as shown in FIGS. 5A-5C) into the cavity 103 of the housing 101.

In some embodiments, deployment of the caster wheel 108 can be actuated in other ways, in addition to or in lieu of the retraction mechanism 115. For example, other forms of springs, multi-link mechanisms, power-assist mechanisms (e.g., solenoids or electrical motors or actuators), cams, linear actuators, and so forth may be used.

In some embodiments, an end 129 of the second shaft 116 may be in a D-shape, and a matching feature of the first receptacle 123 receiving the second shaft may also be in a corresponding D-shape. When the caster assembly 106 is in the retracted position, the second shaft 116 may be lifted up by lifting the caster wheel 108 of the caster assembly 106 to align with the matching feature of the first receptacle 123. Once the caster assembly 106 is in the manually lifted position, the wheel 108 may be pushed sideways into a locked position to engage the D-shaped end 129 with the same shaped matching feature of the first receptacle 123. It should be noted that the end 129 of the second shaft 116 may also be in other shapes for preventing caster assembly 106 from extending out.

Figure 6A:
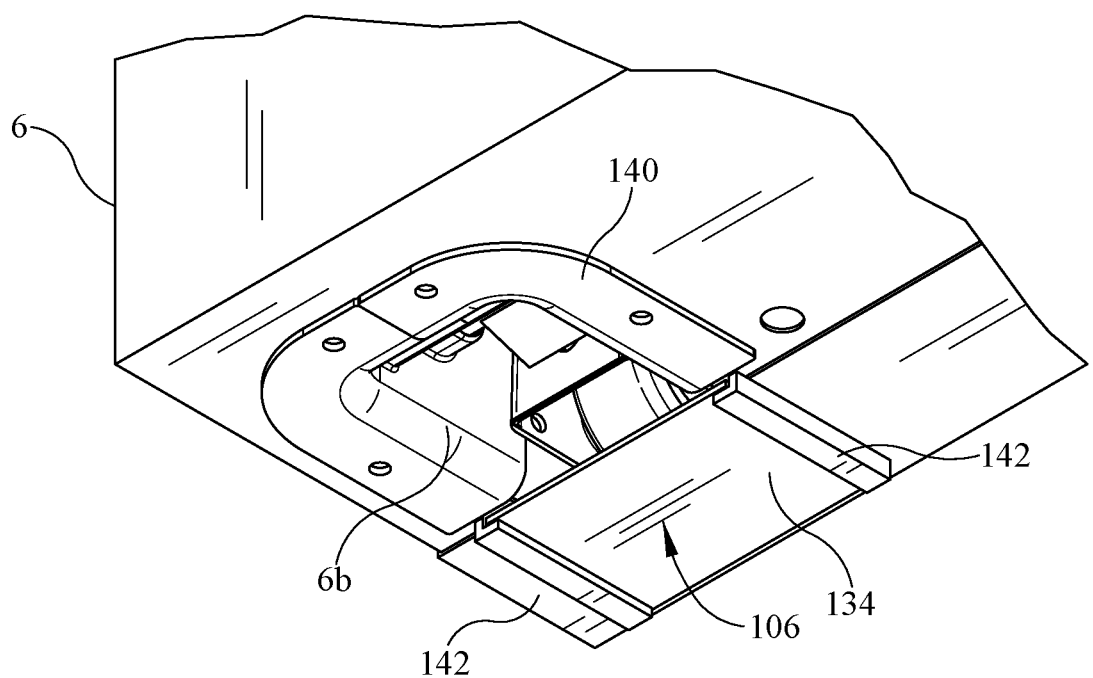
FIGS. 6A-B are perspective views of two exemplary designs for locking the wheel of the wheel support assembly of FIG. 1.
Figure 6B:
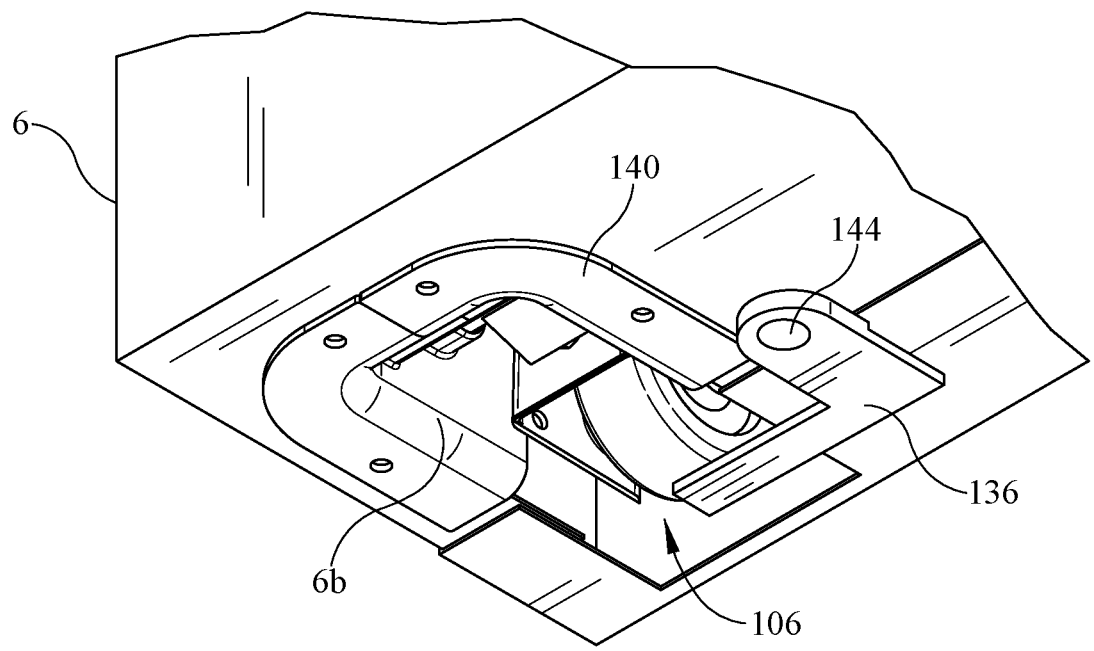

In some embodiments, there may be a moveable lock plate, for example a sliding lock plate 134 slidable along a pair of rails 142. FIG. 6A shows the wheel support assembly 100 in the locked position with the sliding lock plate 134 covering the opening of the recess 6b to prevent the caster assembly 106 from extending out. When the deployed position of the wheel support assembly 100 is desired, the sliding lock plate 134 may be slid to open the recess 6b to allow the caster assembly 106 to rotate freely. In other embodiments, the moveable lock plate may be a hinged lock plate 136 rotating about a pin 144. FIG. 6B shows the wheel support assembly 100 in the locked position with the hinged lock plate 136 preventing the caster assembly 106 from extending out. When the deployed position of the wheel support assembly 100 is desired, the hinged lock plate 136 may be rotated sideways by a user to allow the caster assembly 106 to rotate freely. It should also be noted that other feasible forms of rotation dampers or lock mechanisms may be used to further control the rotational motion of the caster assembly 106.

With the wheel support assembly 100 properly deployed in the deployed position, the load of the bottom freezer drawer door 6 and the main freezer storage bin 2 may be borne by the wheel support assembly 100 because the caster wheel 108 bears against the floor. In this manner, the wheel support assembly 100 provides a resistive support to the torque (tipping force) of the main body of the refrigerator 1. With such a supportive arrangement, the refrigerator 1 may still remain resting safely when the bottom freezer drawer door 6 is fully extended. As the burden of the supporting of the bottom freezer drawer door 6 and the main freezer storage bin 2 is transferred to the ground through the wheel support assembly 100, instead of supporting and maintaining the load only by the rails 7, such an arrangement may also prevent the distortive "bowing" or "bruising" of the rails 7. The caster wheel 108 obviously may roll on the ground by rotating around the first shaft 110 to facilitate the opening process of the bottom freezer drawer door 6.

As discussed above, in some embodiments, the wheel support assembly 100 may be adjusted to have the caster wheel 108 be slightly off the ground when main freezer storage bin 2 is empty as shown in FIG. 5C. In this manner, the wheel support assembly 100 may be adjusted, as desired, to distribute weight in varying proportions between the caster assembly 106 and the rails 7. For example, it might be desired that only a certain threshold amount of weight in the main freezer compartment 9, or when the main freezer compartment 9 is pulled out beyond a second distance D2 (as shown in FIG. 5D) necessitates the caster wheel 108 contacting the ground. The advantages for the caster wheel 108 off the ground may include allowing the caster wheel 108 to rotate completely and freely into the place in the deployed position and avoiding picking up dirt on the ground or scratching the floor by the caster wheel 108.

While several embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein, unless characterized otherwise, are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

The foregoing description of methods and embodiments has been presented for purposes of illustration. It is not intended to be exhaustive or to limit the disclosure to the precise steps and/or forms disclosed, and obviously many modifications and variations are possible in light of the above teaching. It is intended that the scope of the disclosure and all equivalents be defined by the claims appended hereto.

What is claimed is:

1. An appliance having a wheel support assembly, wherein said appliance comprising:
   an appliance drawer having a door and a wheel support assembly within said door;
   a toe kick located below said appliance drawer; and
   wherein said wheel support assembly further comprises:
      a housing located within said door of said appliance drawer, said housing having sidewalls and a back surface defining a cavity therebetween;
      a caster wheel rotatably coupled to a first shaft, said first shaft being disposed within a caster wheel arm inside said housing, wherein said caster assembly is rotatable between a retracted position and a deployed position;
      a rotation member disposed within said housing and having a spring-receiving portion, said rotation member rotatable about a second shaft disposed within said housing, wherein said caster wheel arm is coupled to said rotation member;
      a retraction mechanism disposed within said housing and further comprising a spring disposed about a third shaft within said housing and having one end bearing against said spring-receiving portion, said spring providing a spring bias force biasing said caster assembly toward said deployed position; and
   wherein said appliance drawer is moveable between a closed position and an open position, wherein when said appliance drawer is in said closed position said caster wheel in said retracted position is in contact with said toe kick and when said appliance drawer is in said open position said caster wheel is not in contact with said toe kick and in said deployed position, and when said appliance drawer is moving from said open position to said closed position said toe kick applies a first force to said caster wheel against said spring bias force to rotate said caster wheel from said deployed position to said retracted position;

wherein in said retracted position, a vertical line passing through said second shaft is closer to said back surface than is a vertical line passing through said first shaft, and wherein in said deployed position, said vertical line passing through said first shaft is closer to said back surface than is said vertical line passing through said second shaft.

2. The appliance of claim 1, wherein said retracted position is when said caster wheel is retracted in said cavity, and said deployed position is when said caster wheel extends only through an open bottom.

3. The appliance of claim 2, wherein said caster wheel is not externally visible when in said retracted position.

4. The appliance of claim 1, wherein said housing further comprises a stop projection on a surface of said housing, and said rotation member is retained by said stop projection while rotating around said second shaft.

5. The appliance of claim 1 further comprising a sliding lock plate.

6. The appliance of claim 1 further comprising a hinged lock plate.

7. The appliance of claim 1 wherein said housing includes an open bottom, wherein both said open bottom and said caster wheel in said retracted position is positioned above said toe kick when said appliance drawer is in said closed position.

8. The appliance of claim 7 wherein said open bottom faces downwardly towards a top surface of said toe kick when said appliance drawer is in said closed position.

9. The appliance of claim 7 wherein said caster wheel in said retracted position is biased outwardly towards said deployed position when positioned above said toe kick.

10. The appliance of claim 1 wherein said caster wheel in said retracted position is stacked on top of said toe kick when said appliance drawer is in said closed position.

11. The appliance of claim 1 wherein said housing is stacked above said toe kick when said appliance drawer is in said closed position.

12. The appliance of claim 1 wherein when said appliance drawer is in said closed position said caster wheel in said retracted position is in contact with a top surface of said toe kick.

* * * * *